United States Patent Office 2,966,692
Patented Jan. 3, 1961

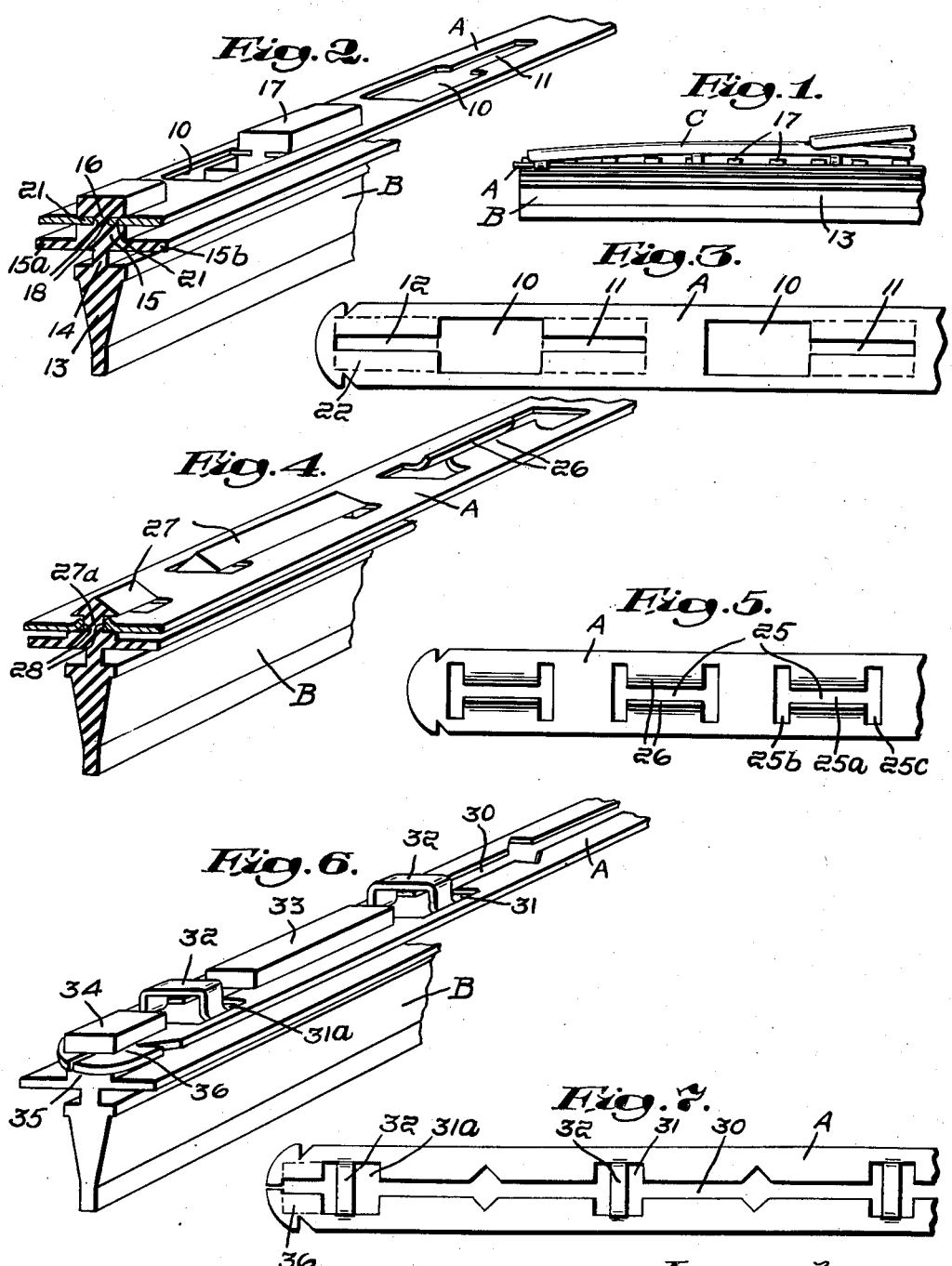

2,966,692

FLEXIBLE BLADE FOR WINDSHIELD WIPERS

Max Zaiger, 589 Essex St., Lynn, Mass.

Filed Mar. 6, 1957, Ser. No. 644,385

2 Claims. (Cl. 15—250.36)

This invention relates to automobile windshield wipers, and more particularly to flexible blades for wiping curved windshields.

A number of flexible blades for wiping curved windshields are at present on the market. A typical form of blade consists of a rubber wiper strip having a continuous longitudinal bead and a reduced neck immediately below the bead, and a metal backer or blade holder having either a continuous slot in which the neck of the strip is engaged, or a number of tabs which engage the neck alternating with arched bridging members which straddle the bead. The continuous slot type of backer has uniform flexibility, but the long side pieces tend to buckle or separate readily because they are connected together only at the ends. The type of backer which has integral bridging members is relatively rigid in the region of these members, and also involves an expensive forming operation. Furthermore, when the blade sticks to the windshield, a rubber strip with a continuous bead tends to pull away readily from the backer along its entire length once the bead has started to pull away at any point.

One object of this invention is to provide a wiper blade, consisting of a rubber strip and a backer, in which the backer grips the strip securely and which is substantially uniformly flexible. Other objects are to provide a backer construction which utilizes a minimum of metal and may be formed by simple stamping or piercing operations.

In one form of blade here described, the backer consists of a flat strip having a number of rectangular openings communicating with narrow longitudinal slots. The rubber strip has a number of spaced rectangular studs connected to the strip by reduced necks. To assemble the strip on to the back, the studs are inserted through the opening and then slid longitudinally to bring the necks into the slots. In another form, the backer has pairs of transverse openings connected by narrow slots. The metal along the edge of the slots is formed into slightly upturned tabs which engage under the studs of the strip. In still another form of blade, the backer has saddles straddling rectangular openings which are connected together by narrow slots having central V-shaped notches, and the necks of the strip are engaged in the slots.

In the drawings illustrating the invention:

Fig. 1 is a fragmentary side view of a wiper blade constructed according to a non-elected form of the invention, shown assembled to a wiper yoke;

Fig. 2 is an enlarged fragmentary perspective view of one form of strip and backer;

Fig. 3 is a fragmentary plan view of the backer of Fig. 2;

Fig. 4 is an enlarged fragmentary perspective view of the preferred form of strip and backer;

Fig. 5 is a fragmentary plan view of the backer of Fig. 4;

Fig. 6 is an enlarged fragmentary perspective view of another non-elected form of the strip and backer; and Fig. 7 is a plan view of the backer of Fig. 6.

As indicated in Fig. 1, the blade, consisting generally of a backer strip A and a rubber wiper strip B, is mounted in a holder C which may be of standard form, for example, composed of multiple yokes which engage the edge of the backer strip. It is understood that the holder C is connected in a suitable manner to the wiping arm of the windshield wiper mechanism, and is of a type adapted to distribute pressure to various points along the blade.

The backer strip A, in the form shown in Figs. 2 and 3, is a flat strip of metal having a number of regularly spaced rectangular openings 10, each communicating with a narrow slot 11 disposed longitudinally in the strip. The opening nearest the left-hand end of the strip, as seen in Fig. 3, communicates with a second narrow slot 12 disposed on the opposite slot 11. The rubber wiper strip B has a squeegee portion 13 connected by a narrow neck 14 to a body portion 15 having sidewardly extending guard flanges 15a and 15b. The body portion 15 is connected by a number of separate necks 16 to spaced rectangular studs 17. These studs thus form, with the body portion, a number of pairs of side grooves 18 disposed at spaced intervals along the blade. To assemble the wiper strip to the backer, the studs 17, which are approximately the same size as openings 10, are inserted through the openings. The strip if then slid along the backer (to the right, as viewed in Fig. 3), until the studs are in the position indicated by the dotted outlines 20. In this position the necks 16 are disposed in the slots 11, and portions 21 of the backer strip on either side of the slots are engaged in grooves 18.

The wiper strip carries one more stud than there are spaces 10 in the backer. When all the studs, except the one on the left end, have been pushed over to align with slots 11, the end of the rubber strip is momentarily compressed and bent to allow the remaining stud to be fed up through the opening 10 which is nearest the left end of the backer. The end stud then moves over to the position indicated by the dotted line 22, and the neck of this stud thus becomes engaged in slot 12. The strip is thus locked against longitudinal movement on the backer and cannot become dislodged accidentally.

In the form of blade shown in Figs. 4 and 5, the backer A has a number of I-shaped openings 25, each including a central longitudinal slot 25a communicating with transverse end slots 25b and 25c. The portions of the backer along either side of slots 25a are formed into upturned lips 26, slots 25b and 25c permitting this to be done readily. The wiper strip B has a number of studs 27 of triangular section along its upper edge. These studs are of the same length as openings 25. The studs are connected to the body of the strip by reduced necks 27a and form, with the body of the strip, a number of pairs of side grooves 28. The remainder of the strip is of the same construction as the strip shown in Figs. 2 and 3.

The strip of Fig. 4 is assembled on to the backer by pushing each of the strips 27 up through one of the slots 25a until lips 26 seat in grooves 28. The triangular shape of the studs and upwardly curving shape of the lips facilitates insertion of the studs in this manner. When the studs are in place the upper edges of the lips bite into the rubber and prevent the strip from pulling out. In this case the number of slots 25a corresponds to the number of studs on the strip.

In the form of blade shown in Figs. 6 and 7, the backer A is similar to conventional backers now in use with continuous bead wiper strips. In fact, this version of the wiper strip can be applied to existing backers.

The backer has a continuous slot 30 communicating longitudinally with spaced pairs of notches 31 bridged by saddles 32. The wiper strip is generally similar to that of Figs. 2 and 3, having studs 33, similar to studs 17, but of a length to correspond to the distance between adjacent notches 31. The strip has a short stud 34 at each end. The studs are all connected to the body of the strip by necks 35. The end notches 31a of the backer are somewhat longer than the intermediate notches. To assemble the strip on the backer, the studs are successively inserted into notches 31a, and the strip is fed along the blade, with the necks in slot 30. Finally, the end stud is forced through notches 31a and slides over to the position indicated by the dotted outline 36, thus locking the strip against longitudinal movement.

In all three forms of the blade here described, each stud is individually secured in the backer. If one stud should break or pull out, there will not be any longitudinal stretching force transmitted to the adjacent studs. For comparison, when a continuous bead pulls away from the backer at one point, the longitudinal force, resulting from bending of the rubber strip, is transmitted to adjacent portions of the bead, tending to stretch those portions longitudinally and thus reduce their transverse dimension. As a result, these portions tend to slip easily out of the backer, and this action progresses rapidly along the entire blade.

The backers of Figs. 3 and 5 can be cut from a metal strip of their finished width, without waste, and can be formed by a simple punching operation. These backers thus require only about half the amount of metal used in a saddle type of backer. All forms of the blade are of substantially uniform flexibility throughout their length because the lesser amount of rubber between the studs tends to compensate for the rigidity of the solid portions of the backer in those regions. A strip made in this manner with spaced studs along the back is inherently more flexible than conventional strips which have a relatively heavy continuous bead along the back.

What is claimed is:

1. A windshield wiper blade comprising: a wiper strip having a body portion, a number of longitudinally spaced apart studs, and a corresponding number of narrow necks connecting said studs to said body portion; and a generally flat backer strip having a number of generally I-shaped openings, each of which has transverse end slots communicating with a longitudinal central slot, each stud being insertable through one of said longitudinal slots, and each of said necks being engaged in one of said longitudinal slots, said backer having on either side of each of said longitudinal slots, lips bent out of the plane of the backer, each lip engaging one of said studs.

2. A windshield wiper blade comprising: a wiper strip having a body portion, a number of longitudinally spaced apart studs of generally triangular cross-section, and a corresponding number of narrow necks connecting said studs to said body portion; and a generally flat backer strip having a number of longitudinal openings, each of said necks being engaged in one of said openings, and the backer having, on each side of each of said openings, an upwardly curving lip, said lips seating under said studs.

References Cited in the file of this patent

UNITED STATES PATENTS 2,766,474     Horton _____ Oct. 16, 1956